(12) United States Patent
Chang et al.

(10) Patent No.: US 9,251,081 B2
(45) Date of Patent: Feb. 2, 2016

(54) MANAGEMENT OF CACHES

(71) Applicant: Advanced Micro Devices, Inc., Sunnyvale, CA (US)

(72) Inventors: Kai K. Chang, Hillsborough, CA (US); Yasuko Eckert, Kirkland, WA (US); Gabriel H. Loh, Bellevue, WA (US); Lisa R. Hsu, Durham, NC (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 238 days.

(21) Appl. No.: 13/957,105

(22) Filed: Aug. 1, 2013

(65) Prior Publication Data
US 2015/0039833 A1 Feb. 5, 2015

(51) Int. Cl.
*G06F 12/08* (2006.01)
*G06F 12/12* (2006.01)

(52) U.S. Cl.
CPC .......... *G06F 12/0848* (2013.01); *G06F 12/122* (2013.01)

(58) Field of Classification Search
CPC ........................... G06F 12/0848; G06F 12/122
See application file for complete search history.

(56) References Cited

U.S. PATENT DOCUMENTS

2012/0117350 A1* 5/2012 Bates et al. .................. 711/165

* cited by examiner

*Primary Examiner* — Yong Choe
(74) *Attorney, Agent, or Firm* — Rory D. Rankin; Meyertons, Hood, Kivlin, Kowert & Goetzel, P.C.

(57) ABSTRACT

A system and method for efficiently powering down banks in a cache memory for reducing power consumption. A computing system includes a cache array and a corresponding cache controller. The cache array includes multiple banks, each comprising multiple cache sets. In response to a request to power down a first bank of the multiple banks in the cache array, the cache controller selects a cache line of a given type in the first bank and determines whether a respective locality of reference for the selected cache line exceeds a threshold. If the threshold is exceeded, then the selected cache line is migrated to a second bank in the cache array. If the threshold is not exceeded, then the selected cache line is written back to lower-level memory.

20 Claims, 6 Drawing Sheets

MANAGEMENT OF CACHES

BACKGROUND

1. Field of the Invention

This invention relates to computing systems, and more particularly, to efficiently powering down banks in a cache memory for reducing power consumption.

2. Background

A microprocessor may be coupled to one or more levels of a cache hierarchy in order to reduce the latency of the microprocessor's request of data in memory for a read or a write operation. Generally, a cache may store one or more blocks, each of which is a copy of data stored at a corresponding address in the system memory. Since caches have finite sizes, the total number of cache blocks is inherently bounded. Additionally, there may be a limit on the number of blocks that map to a given set in a set-associative cache. However, there may be conditions that benefit from a finer limit on a number of cache blocks associated with a given cache property than a limit offered by the cache capacity or the cache associativity. Examples of the cache property may include one or more of a coherence state, a dirty state, a source ownership state, a remote state that may be used in a non-uniform memory access (NUMA) computing system, and so forth.

Providing the finer limit on the number of cache blocks associated with the given cache property may reduce latencies for searching for the number of cache blocks and moving the number of cache blocks prior to setting the cache in a different state. The different state may be a low-power mode. Alternatively, the different state may be a power-up mode for a given portion in the cache memory. Additionally, the finer limit may reduce a number of conflict misses for a set-associative or a direct-mapped cache for both cache blocks with and without the cache property.

Further, the latency for the cache to transition to a given state, such as a low-power mode, may be reduced with the finer limit. For example, to manage power consumption, chip-level and system-level power management systems typically disable portions of the chip or system when experiencing no utilization for a given time period. However, transitioning portions of the cache to a low-power mode and later returning to an active mode may be delayed until the number of cache blocks associated with the cache property are each migrated to another portion or evicted and written back to lower-level memory. Without the finer limit, the transition latency may be too large. The large latency may reduce both the benefits of the power management system and the number of times the transition actually occurs despite the power management system notifications.

In view of the above, efficient methods and systems for efficiently powering down banks in a cache memory for reducing power consumption are desired.

SUMMARY OF EMBODIMENTS

Systems and methods for efficiently powering down banks in a cache memory for reducing power consumption are contemplated. In various embodiments, a computing system includes a cache array and a corresponding cache controller. The cache array may include multiple partitions, each comprising multiple subdivisions. In various embodiments, the partitions are banks within the cache array and the subdivisions are portions of cache sets within the banks. Each cache set may expand across the multiple partitions. The cache controller may receive a request to power down a first bank of the multiple banks in the cache array. The cache controller may select a cache line of a given type. In some examples, the given type is a dirty cache state. The cache controller may determine whether the selected cache line will be used again. In some embodiments, an estimation or computation of cache locality is determined for the selected cache line. If the computed cache locality exceeds a threshold, then the cache controller migrates the selected cache line to a second bank in the cache array. If the computed cache locality does not exceed the threshold, then the cache controller writes back the selected cache line to lower-level memory. The lower-level memory may be a lower-level cache or system memory.

In some embodiments, the cache controller may determine to migrate or to write back other cache lines with other cache properties, such as clean cache lines. The determination of the respective cache locality for a given clean cache line may be based on one or more of several criteria. Some examples of the criteria may include least-recently-used (LRU) values, dirty cache line write hit counts maintained on a cache set basis, re-use distance, and shared status by multiple processor cores. In addition, the criteria in both the first bank and the second bank may be used for the determination.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENT(S)

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
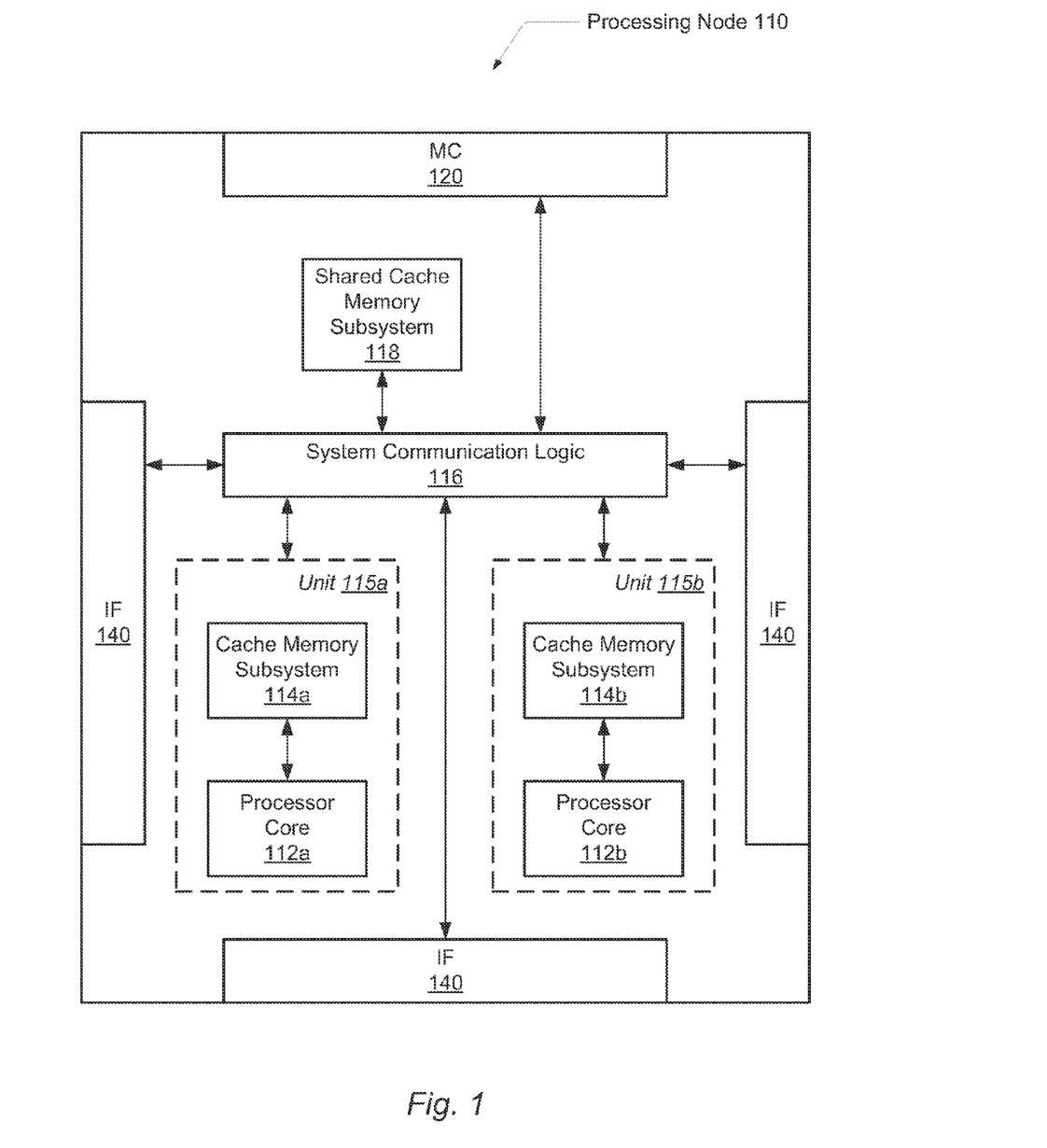
FIG. 1 is a generalized block diagram of one embodiment of a processing node.

Referring to FIG. 1, one embodiment of a processing node 110 is shown. Generally speaking, processing node 110 may include memory controller 120, interface logic 140, one or more processing units 115, which may include processor cores 112a-112b and corresponding cache memory subsystems 114a-114b; system communication logic 116, and a shared cache memory subsystem 118. In one embodiment, the illustrated functionality of processing node 110 is incorporated upon a single integrated circuit. In another embodiment, the illustrated functionality is incorporated in a chipset on a computer motherboard.

In one embodiment, processing node 110 is a stand-alone system within a mobile computer, a desktop, a server, or other. In other embodiments, processing node 110 is one node within a socket of a multi-socket system. In some embodiments, the processing units 115a-115b and one or more other sources outside of processing node 110 may access the shared cache memory subsystem 118. The other sources may include general-purpose processors and graphical processing units (GPU's) on other nodes, input/output (I/O) devices, and so forth. In other embodiments, another level of cache, such as caches 114a-114b, in the cache memory hierarchy may be shared by multiple sources. Regardless of the level within the memory hierarchy, the shared cache may be partitioned. The partition may include particular ways and/or sets of a set-associative cache, banks of a multi-bank cache, and so forth.

One or more of the caches 114a-114b and 118 may have a limit on storage space for data with particular cache properties. The limit may be enforced regardless of whether or not contention exists for allocating data with the particular cache properties. For example, storage space may be approaching the limit although an appreciable amount of storage space may be free. The limit may still be enforced despite the available free storage space. A limit may correspond to a given partition of one of the caches 114a-114b and 118.

One or more sources may generate memory requests for data of a first type. The one or more sources may include the processing units 115a-115b, input/output (I/O) devices, processing units in other nodes, and so forth. A data type may simply be referred to as a type. The type may correspond to a property or attribute of cached data. For example, the property or attribute may include a cache entry valid state, dirty and clean cache line states, home or local node and remote node states, cache coherence states, process or processor owner identifiers (ID's), thread ID's, system-level transaction ID's, shared and private states, instruction type and data type, and so forth. The property or type may also include a combination of two or more of the examples. In some embodiments, one or more of the caches 114a-114b and 118 is a partitioned cache. One or more partitions may be designated for storing data of a given type. In some embodiments, the partitions are cache banks.

In response to receiving a request to allocate data of the first type and determining the designated first partition for the first type is unavailable, in various embodiments, a shared cache controller allocates the data of the first type to another partition different from the designated first partition. For example, the cache controller allocates the data of the first type to a second partition different from the first partition. This allocation occurs despite the designated earlier assignments. In other embodiments, the cache controller allocates the data of the first type across multiple other available partitions different from the first partition. As allocation requests for data of the first type are received, the cache controller, in some embodiments, evenly distributes the corresponding data across the multiple other available partitions different from the first partition. The allocation of data of the first type continues to occur in this manner until a limit is reached.

Power management logic on the processing node 110 also determines whether to power down a given partition in one of the caches 114a-114b and 118. The given partition may be a bank of multiple banks in the corresponding cache. One or more cache lines of a given type in the given bank are migrated to another active bank in the corresponding cache. In various embodiments, the given type is a cache dirty state. However, if all dirty cache lines are migrated to another active bank, then the amount of traffic for the cache typically significantly increases and stalls both the bank power down mechanism and the processing of received memory access requests. In addition, a significant portion of the migrated dirty cache lines may have relatively low locality of reference or cache locality, such as low spatial locality, low temporal locality, or both. Therefore, conflict misses and later evictions may occur.

Alternatively, one or more of the dirty cache lines in the given bank may be written back to lower-level memory. Lower-level memory may be a lower-level cache for a current cache level or it may be system memory. For example, a level 2 (L2) cache is considered a lower level cache than a level one (L1) cache. However, if all dirty cache lines are written back to lower-level memory, then traffic may significantly increase on the memory bus. In addition, a significant portion of the dirty cache lines may have relatively high locality of reference and later be reinstalled into the cache, which adds latency and again increases traffic on the memory bus.

Rather than migrate all dirty cache lines to another active bank or write back all dirty cache lines to lower-level memory, control logic in the cache controller selects which dirty cache lines to migrate and which dirty cache lines to write back. The cache controller may be a controller for one of the caches 114a-114b and 118. In various embodiments, the control logic determines a respective cache locality for a selected dirty cache line. The cache locality is used to estimate whether the selected cache line will be used again. The cache locality may also be referred to as the locality of reference and vice-versa. The locality of reference for a given memory location, such as a cache line, is a likelihood that the given memory location is accessed again. The locality of reference may include both temporal locality and spatial locality. The temporal locality may refer to a temporal proximity between the adjacent accesses to a same memory location. The spatial locality may refer to a likelihood that an access to a second memory location occurs based on a previous access of a first memory location.

Different measurements, counts and computations may be performed to determine a locality of reference for a given cache line. Some examples of determinations for spatial locality are provided here. One example of determining spatial locality between the first and the second memory locations includes determining the first and second memory locations are contiguous memory locations. Another example of determining spatial locality includes determining the first and the second memory locations are located within a predefined distance of one another. Yet another example of determining spatial locality includes determining the first and second memory locations are separated by a predicted stride of accesses. In various embodiments, if the computed cache locality exceeds a threshold, then the control logic migrates the selected dirty cache line to another active bank. If the computed cache locality does not exceed the threshold, then the control logic performs a write back of the selected dirty cache line to the lower-level memory.

The computed cache locality may be determined based on several criteria. The criteria may include at least one or more of the selected dirty cache line is located within a given re-use distance, a number of processor cores sharing the selected dirty cache line, a respective least-recently-used (LRU) value for the selected dirty cache line, a local or remote node state of the selected dirty cache line, and a respective count of dirty cache line hits for the bank being shutdown and currently storing the selected dirty cache line.

Additionally, rather than use thresholds, the dirty cache lines may be ranked against one another based on respective cache localities or localities of reference. A given static fraction of the dirty cache lines with the strongest locality of reference may be selected for migration, while the remaining unselected dirty cache lines are written back to lower-level memory. Further, the criteria may include a combination of the above criteria for both the bank being shut down and the active bank being used for migration. Any static fractions and thresholds may be stored in configuration and status registers (CSRs) and these stored values may be programmable. Alternatively, any static fractions and thresholds may be stored or utilized in a non-programmable manner, such as being stored in a read-only memory (ROM), being implemented in a circuit or control logic, being hard-wired to given values, and so forth. Before providing more details, a further description of the components in the processor 100 is given.

Although two processor cores are shown in FIG. 1, the processing node 110 may include another number of processor cores, such as a single processor core, four processor cores, and so forth. In various embodiments, processor cores 112a-112b include circuitry for executing instructions according to a predefined instruction set. The x86® instruction set architecture (ISA) may be selected. Alternatively, the x86-64®, Alpha®, PowerPC®, MIPS®, SPARC®, PA-RISC®, or any other instruction set architecture may be selected. In other embodiments, the processor cores 112a-112b may include other processors such as a graphics processing unit (GPU), another type of single-instruction-multiple-data (SIMD) core, a digital signal processor (DSP), a field programmable gate array (FPGA), and other computing circuitry. Generally, processor cores 112a-112b access the cache memory subsystems 114a-114b, respectively, for data and instructions. As used herein, the term "access" regarding a cache memory subsystem refers to performing a read or a write request operation that may result in a cache hit if the requested data of a corresponding request address resides in the cache or a cache miss if it does not reside in the cache.

If a cache miss occurs, such as a requested block is not found in a respective one of the cache memory subsystems 114a-114b or in shared cache memory subsystem 118, then a read request may be generated and transmitted to the memory controller 120 within the node 110 to which the missing block is mapped. A corresponding cache fill line with the requested block may be conveyed to the corresponding cache in order to complete the original read or write request. In addition, the cache fill line may be placed within a corresponding set within the cache. If there are no available ways within the corresponding set, then typically a Least Recently Used (LRU) algorithm determines which way within the set is to have its data evicted and replaced by the cache fill line data. As used herein, the term "allocate" refers to storing a cache fill line fetched from a lower level of the cache hierarchy into a way of a particular cache subsequent a cache miss to the particular cache.

As used herein, a "block" is a set of bytes stored in contiguous memory locations, which are treated as a unit for coherency purposes. As used herein, the terms "cache block", "block", "cache line", and "line" are interchangeable. In some embodiments, a block may also be the unit of allocation and deallocation in a cache. The number of bytes in a block may be varied according to design choice, and may be of any size. As an example, 32 byte and 64 byte blocks are often used.

Cache subsystems 114a-114b and 118 may comprise high-speed cache memories or arrays configured to store blocks of data. A corresponding cache controller may be coupled to the cache arrays. The cache controller may include programmable configuration and status registers (CSRs) and control logic. The CSR's and the control logic may be used to limit an amount of data of a given type to be stored in the cache or in at least one partition of the cache. The CSR's may also be used to store thresholds and static fraction values for determining localities of reference of dirty cache lines being evicted when a given partition is being powered down.

Alternatively, the cache controller may include or have access to non-programmable options for providing the static fractions and thresholds for limiting an amount of data of the given type to be stored in the cache or in at least one partition of the cache. Examples of the non-programmable options may include a read-only memory (ROM), a circuit or control logic that output the values, hard-wired given values, and so forth. Cache memory subsystems 114a-114b may be implemented as a hierarchy of caches. In one embodiment, cache memory subsystems 114a-114b each represent L2 cache structures, and shared cache subsystem 118 represents an L3 cache structure. An L1 cache structure may be integrated within each of the processor cores 112a-112b. Other embodiments are possible and contemplated.

Data already presently stored in the cache may be hit for a read or a write access by any source despite the values stored in the CSR's. For example, the cache may have modified data, and, therefore, lower levels of the memory hierarchy may have corresponding stale data. The requesting source should receive the updated copy of the requested cache line. Therefore, for a particular way within a particular set of a shared cache, an access from any source is still permitted. However, allocation due to a cache miss may be determined by the availability of any partitions within the cache and values, such as a limit, stored in the CSRs or provided by non-programmable means.

Memory controller 120 may be used to connect the processor 100 to off-die memory. Memory controller 120 may comprise control circuitry for interfacing to memories. Memory controller 120 may follow memory channel protocols for determining values used for information transfer, such as a number of data transfers per clock cycle, signal voltage levels, signal timings, signal and clock phases and clock frequencies. Additionally, memory controller 120 may include request queues for queuing memory requests. The off-die memory may include one of multiple types of dynamic random access memories (DRAMs). The DRAM may be further connected to lower levels of a memory hierarchy, such as a disk memory and offline archive memory.

The interface 140 may include integrated channel circuitry to directly link signals to other processing nodes, which include another processor. The interface 140 may utilize one or more coherence links for inter-node access of processor on-die caches and off-die memory of another processing node. Examples of the technology include HyperTransport and QuickPath. The input/output (I/O) interface 142 generally provides an interface for I/O devices off the processor 100 to the shared cache memory subsystem 132 and processing units 110a-110d and 120. I/O devices may include many variations of computer peripheral devices.

In one embodiment, system communication logic 116 is a system bus. In another embodiment, processing node 110 incorporates a Northbridge system bus controller in logic 116 in order to couple processing units 115a-115b to an off-chip memory, input/output (I/O) devices, other off-chip processors such as a graphics processing unit (GPU), another type of single-instruction-multiple-data (SIMD) core, a digital signal processor (DSP), other general-purpose processors, and so forth. In such an embodiment, system communication logic 116 may replace or incorporate the functionality of memory controller 120 and interface logic 140.

In one embodiment, logic 116 may incorporate both a Northbridge and a Southbridge system bus controller. A Northbridge protocol may be used to couple processing units 115a-115b to off-chip memory and a GPU. A Southbridge protocol may be used to couple processing units 115a-115b to I/O Devices, a real time clock, a power management unit, or other. One example of such an embodiment of logic 116 may include the AMD-762™ Northbridge system controller and the AMD-768™ Southbridge peripheral bus controller.

In yet another embodiment, processing node 110 is one socket of a multi-socket system. System communication logic 116 may incorporate packet-processing logic in such an embodiment. Generally speaking, system communication logic 116 may be configured to respond to control packets received on the links to which the processing node 110 is coupled, to generate control packets in response to processor cores 112a-112b and/or cache memory subsystems 114a-114b, to generate probe commands and response packets in response to transactions selected by the memory controller 120 for service, and to route packets for which node 110 is an intermediate node to other nodes through interface logic 140. Interface logic 140 may include logic to receive packets and synchronize the packets to an internal clock used by packet processing logic within logic 116.

Figure 2:
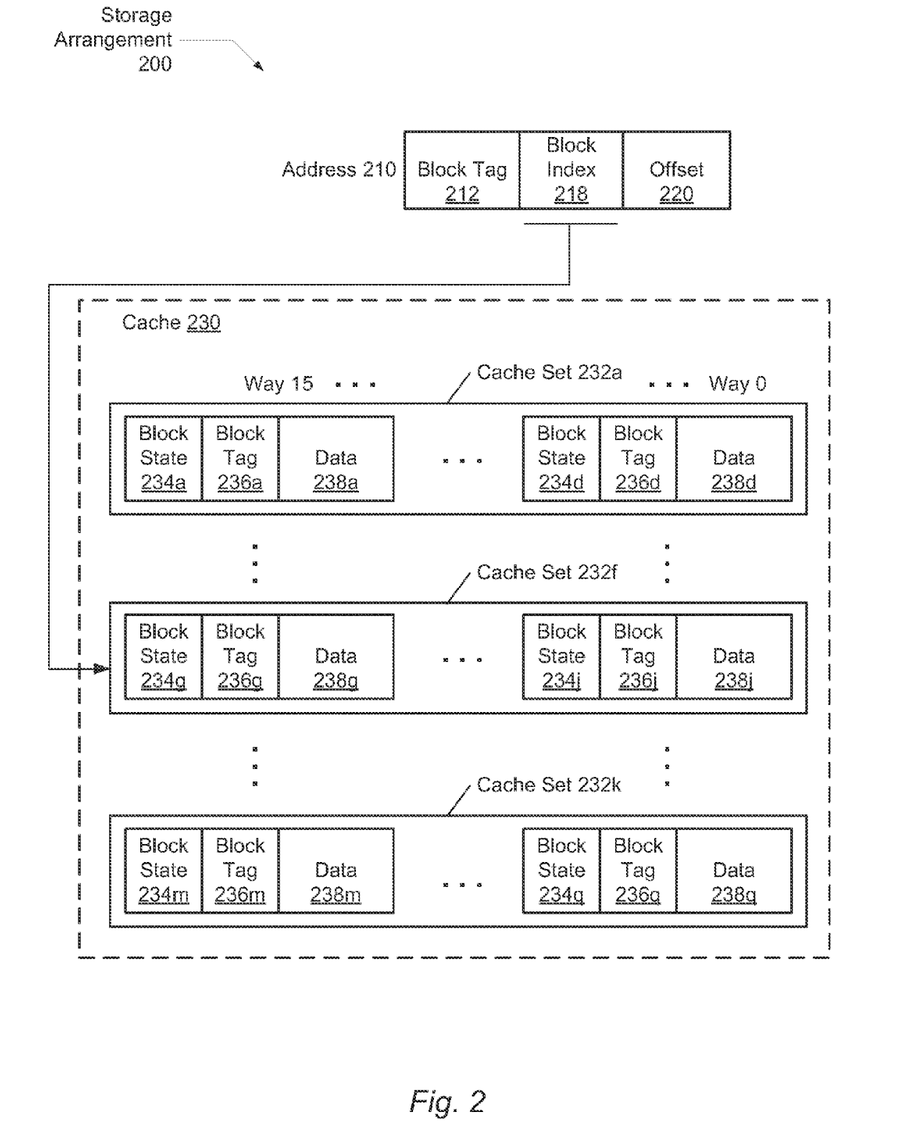
FIG. 2 is a generalized block diagram of one embodiment of a cache data storage arrangement.

Data may be stored within an array of a cache in various manners. For example, FIG. 2 illustrates one embodiment of a storage arrangement 200 in which data are stored using a 16-way set-associative cache organization. A different number of ways, such as 4-way, 8-way, or other, within the set-associative cache may be chosen. Alternatively, a fully associative or direct-mapped implementation may be used. The cache 230 may include multiple cache sets 232a-232k. In some embodiments, a portion of a given one of the cache sets 232a-232k is a subdivision within a partition of the cache 230. Partitions are not explicitly shown in FIG. 2. Partitions may be cache banks, cache ways, and so forth. A given one of the cache banks 232a-232k may be selected from other sets by a block index 218 portion of an address 210 used to access the cache 230. A cache block hit may occur when the block tag 212 and a given one of the tags 236a-236m contain a same value and a corresponding one of the block states 234a-234m designates predetermined match values such as a valid cache block.

In one embodiment, the data portions 238a-238m of a cache line, or cache block, within the cache 230 is configured to store 64 bytes. Other sizes are possible and contemplated. Each of the 16 ways of cache 230 may also store state information. A given one of the block states 234a-234m may comprise at least one or more of the following: a valid bit, a cache block owner encoding that indicates the source which owns the corresponding cache block, Least Recently Used (LRU) eviction information used in association with a cache replacement algorithm employed by a cache controller, an indication that designates a cache coherency state such as modified, exclusive, owned, shared, and invalid; a process ID and/or a thread ID; a node ownership ID; a clean/dirty state; and so forth. Other included state information is possible and contemplated. In addition, each of the cache sets 232a-232k may include storage for a respective count of hits on dirty cache lines for read accesses, write accesses, or both read and write accesses. The stored counts may be used for determining localities of reference of dirty cache lines when a given partition is being powered down.

A given one of the block tags 236a-236m may be used to determine which of the 16 cache lines are being accessed within a chosen one of the cache sets 232a-232k. Again, in some embodiments, portions of the cache sets 232a-232k are subdivisions within partitions of the cache 230. In addition, offset 230 of address 210 may be used to indicate a specific byte or word within a cache line. A given one of the cache sets 232a-232k may be chosen by the block index 218 of address 210. Although the block state and the block tag may be stored in contiguous bits with the data within each cache way, in one embodiment, the block state and the block tag may be stored in a separate array, rather than in a same array as the data.

Figure 3:
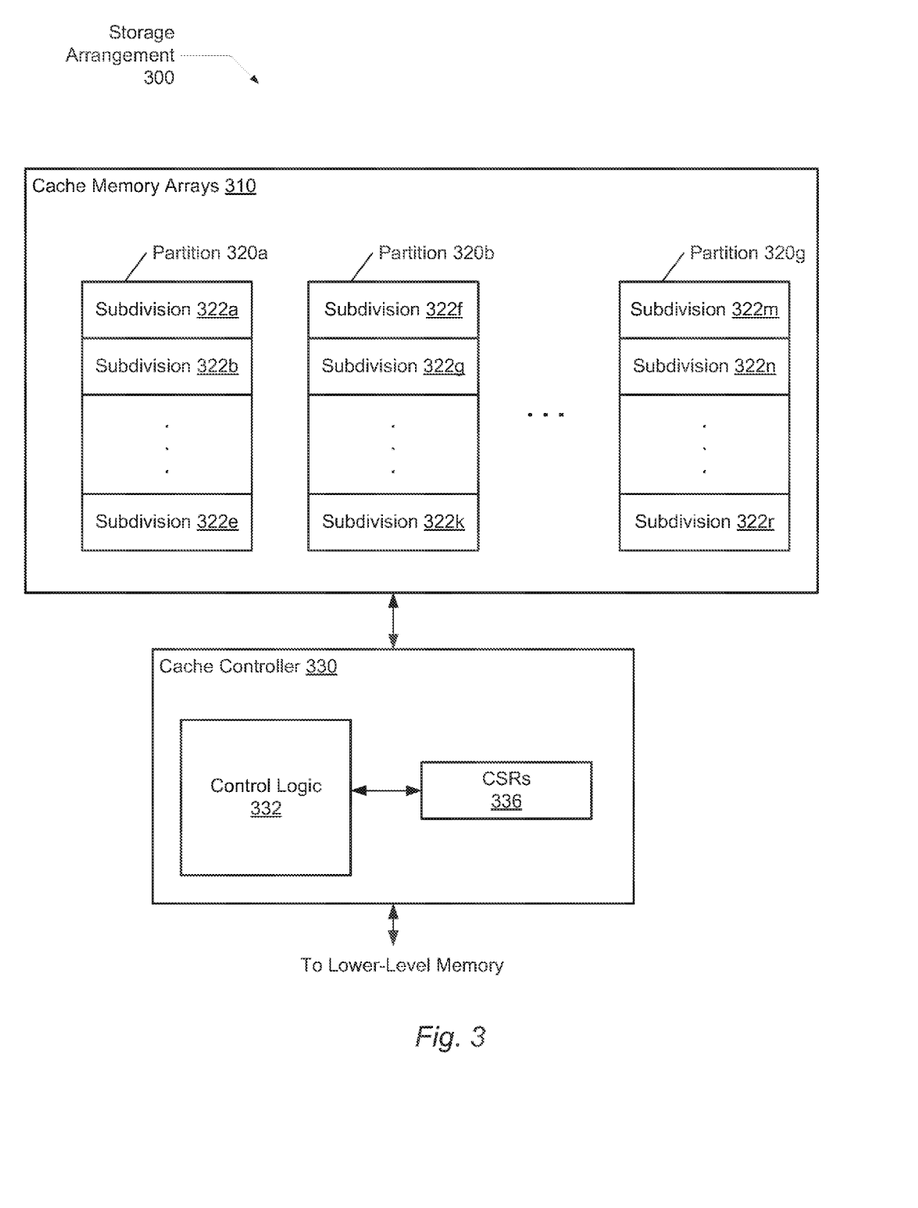
FIG. 3 is a generalized block diagram of another embodiment of a cache data storage arrangement.

Turning now to FIG. 3, a generalized block diagram illustrating another embodiment of a cache storage arrangement 300 is shown. As shown, cache 310 includes partitions 320a-320g. The number of partitions may vary from one embodiment to the next. In various embodiments, the partitions 320a-320g are cache banks. Each of the partitions 320a-320g includes multiple subdivisions. For example, partition 320a includes subdivisions 322a-322e, partition 320b includes subdivisions 322f-322k and partition 320g includes subdivisions 322m-322r.

In various embodiments, the partitions 320a-320g are cache banks and the subdivisions 322a-322r are bank entries. Each of the subdivisions 322a-322r may include a portion of a corresponding cache set within a corresponding one of the partitions 320a-320g. Each cache set may expand across the multiple partitions 320a-320g. For example, a given cache set includes at least the top subdivisions, such as at least subdivisions 322a, 322b, and 322m. In some embodiments, each one of the partitions 320a-320g has a same storage capacity. In other embodiments, one or more of the partitions 320a-320g has less or more storage capacity than other ones of the partitions 320a-320g. Additionally, each of a number of sets in a set-associative cache may be distributed across the partitions 320a-320g.

Each of the partitions 320a-320g of the cache 310 may be designated for storing data of a given data type. The type may correspond to a property or an attribute of cached data as previously described. In some embodiments, each one of the partitions 320a-320g corresponds to a given one of multiple nodes in a multi-node system. One of the partitions 320a-320g may correspond to data associated with a home or local node. The other partitions of the partitions 320a-320g may correspond to data associated with remote nodes in the system. For example, the cache 310 may include eight partitions with one partition for home or local data and seven partitions for data associated with seven remote nodes. In some embodiments, each one of the partitions 320a-320g may transition to an inactive power mode, such as being powered down, independent of the other partitions.

In various embodiments, the arrangement of cache 310 with multiple partitions, such as partitions 320a-320g, allows for efficient limiting of and searching for cache lines with a given property or type. In particular, the cache controller 330 associated with cache 310 concurrently searches for cache lines with a given type in different banks. In some embodiments, the cache controller 330 includes control logic 332 for performing several actions. These actions include determining whether to migrate or write back cache lines of a given type when a given bank is being powered down. In various embodiments, the given type is a dirty cache line state. The determination may be based on localities of reference computed for the cache lines of the given type.

Continuing with the actions performed by the control logic 332, these actions also include one or more of the following: determining a limit of an amount of data of a given type to be allocated in a given one of the partitions 320a-320g, selecting one of the partitions 320a-320g for allocating data, determining when each one of the partitions 320a-320g is available, determining where to store data of a given type when a designated one of the partitions 320a-320g is unavailable, performing steps to allocate recently received data of a given type in a given one of the partitions 320a-320g and maintain an associated limit when the associated limit is reached, and so forth.

The time spent searching for cache lines of a given type arranged in a manner similar to cache 310 may be less than the time spent in which all lines are searched. For example, the time consumed for searching for dirty cache lines in a partition being powered down may be less than the time consumed for searching for dirty cache lines throughout the entire cache 310. In some embodiments, the given type to search in a bank being powered down may include properties in addition to being dirty, or other properties different than being dirty.

In various embodiments, configuration and status registers (CSRs) 336 store programmable encoded values in order to control the allocation space for each one of the partitions 320a-320g. For example, a limit of an amount of data of a given type stored in a given one of the partitions 320a-320g is programmed. The limit is more restrictive than the storage capacity of the given partition. An inactive power mode may be a low power mode or a powered down state wherein the corresponding partition is unavailable for accesses. Additionally, the CSRs 336 store any programmable static fractions and thresholds to be used for determining localities of reference for cache lines of a given type when a given one of the partitions 320a-320g is becoming inactive. In other embodiments, static fractions and thresholds are stored or utilized in a non-programmable manner, such as being stored in a read-only memory (ROM), being implemented in a circuit or control logic, being hard-wired to given values, and so forth. In various embodiments, localities of reference are used to determine which cache lines of a given type are migrated to an active partition of the partitions 320a-320g and which cache lines of the given type are written back to lower-level memory.

Figure 4:
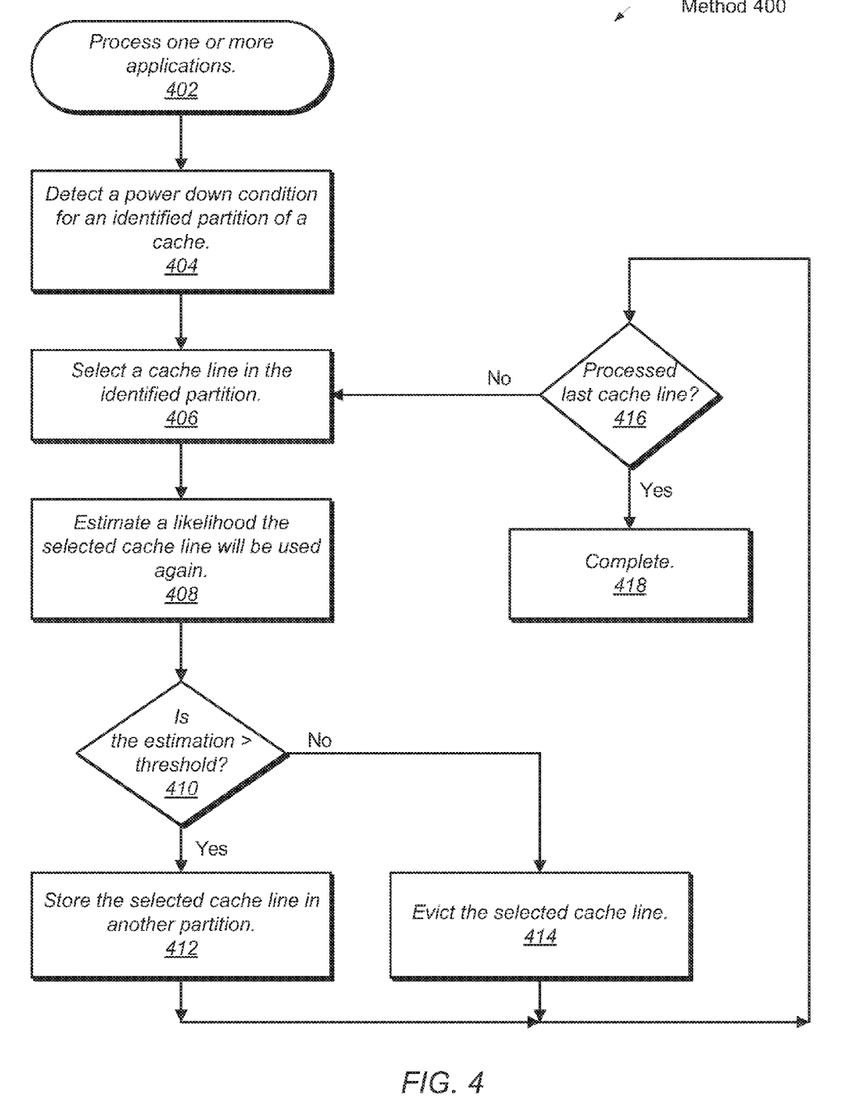
FIG. 4 is a generalized flow diagram of one embodiment of a method for efficiently reallocating data in a cache during power down of a bank.

Referring now to FIG. 4, a generalized flow diagram of one embodiment of a method 400 for efficiently reallocating data in a cache during power down of a bank is illustrated. The components embodied in the computing system and cache storage arrangements described above may generally operate in accordance with method 400. Additionally, program instructions, or generally software, executable by a processor may cause operation in accordance with method 400. For purposes of discussion, the steps in this embodiment are shown in sequential order. However, some steps may occur in a different order than shown, some steps may be performed concurrently, some steps may be combined with other steps, and some steps may be absent in another embodiment.

In block 402, instructions of one or more software applications may be processed and a given cache may be accessed. Both prior and during processing, one or more CSR's may be programmed to store given values or may be reset to store given initial values. In various embodiments, the CSR's are used to store thresholds and fraction values for determining localities of reference of dirty cache lines being evicted when a given partition is being powered down.

In various embodiments, the fraction values are static values until they are reprogrammed. In other embodiments, the fraction values are dynamic and dependent on other thresholds, values, or measurements that vary over time. In yet other embodiments, any static fractions and thresholds are stored or utilized in a non-programmable manner, such as being stored in a read-only memory (ROM), being implemented in a circuit or control logic, being hard-wired to given values, and so forth.

In block 404, power management logic may detect a power down condition for an identified partition of a cache. In various embodiments, the identified partition is an identified bank of multiple banks within the cache. In various embodiments, the power management logic sends notification to control logic within a corresponding cache controller for the cache.

In various embodiments, the control logic within the cache controller searches the cache lines within the identified bank for cache lines of a given type. As described earlier, the given type may include a cache entry valid state, dirty and clean cache states, home or local node and remote node states, cache coherence states, process or processor owner identifiers (ID's), thread ID's, system-level transaction ID's, shared and private states, instruction type and data type, and so forth. The given type may also include a combination of two or more of the examples. In other embodiments, the control logic within the cache controller searches for cache lines of a first type and cache lines of a different second type, rather than search for cache lines of only one type.

In some embodiments, the cache lines of the given type include dirty cache lines. In other embodiments, the cache lines of the first type include dirty cache lines and the cache lines of the different second type include clean cache lines. Although clean lines may not need to be written back to lower-level memory for correctness, the locality of reference of the clean cache lines may exceed a given threshold and it may be determined beneficial to keep these clean cache lines in another active bank. In yet other embodiments, the cache lines of the given type include instruction cache lines versus data cache lines. The instruction cache lines may have a corresponding locality of reference that exceeds a given threshold and it may be determined beneficial to keep these instruction cache lines in another active bank.

During the search of the cache lines within the identified bank for cache lines of the given type, in block 406, the control logic selects a cache line of the given type in the identified partition. In block 408, in some embodiments, the control logic estimates a likelihood the selected cache line will be used again. In some embodiments, the estimation is a probability that a computer program will use the selected cache line again. In other embodiments, the estimation is a computation of a locality of reference for the selected cache line. As described earlier, a respective locality of reference for the selected cache line may be determined based on several criteria as listed earlier.

Additionally, rather than use comparisons against thresholds, the cache lines of the given type may be ranked against one another based on respective localities of reference. A given static fraction of the highest locality of reference cache lines of the given type may be selected for migration, while the remaining cache lines of the given type are written back to lower-level memory. For example, with an M-way set associative cache, if a cache line of the given type is found among the M/2 cache lines with the highest locality of reference, then the cache line may be migrated to another active bank. Otherwise, the cache line of the given type may be written back to lower-level memory. Other fractions than M/2 may be chosen.

If the locality of reference or other estimation of the selected cache line of the given type exceeds a threshold or a rank (conditional block 410), then in block 412, the selected cache line is stored in another partition of the cache. In some embodiments, the other partition is another active bank of multiple banks in the cache. Otherwise, in block 414, the selected cache line is evicted. In some embodiments, the selected cache line may be simply invalidated, such as when the selected cache line is a clean cache line. In other embodiments, the selected cache line may be written back to lower-level memory. For example, the selected cache line may be a dirty cache line and written back. If the last cache line in the identified partition to be powered down is processed (conditional block 416), then in block 418, the reallocation steps are completed. The identified bank in the cache may be powered down or made unavailable (inactive). Otherwise, control flow of method 400 returns to block 406 and another cache line in the identified partition is selected.

Figure 5:
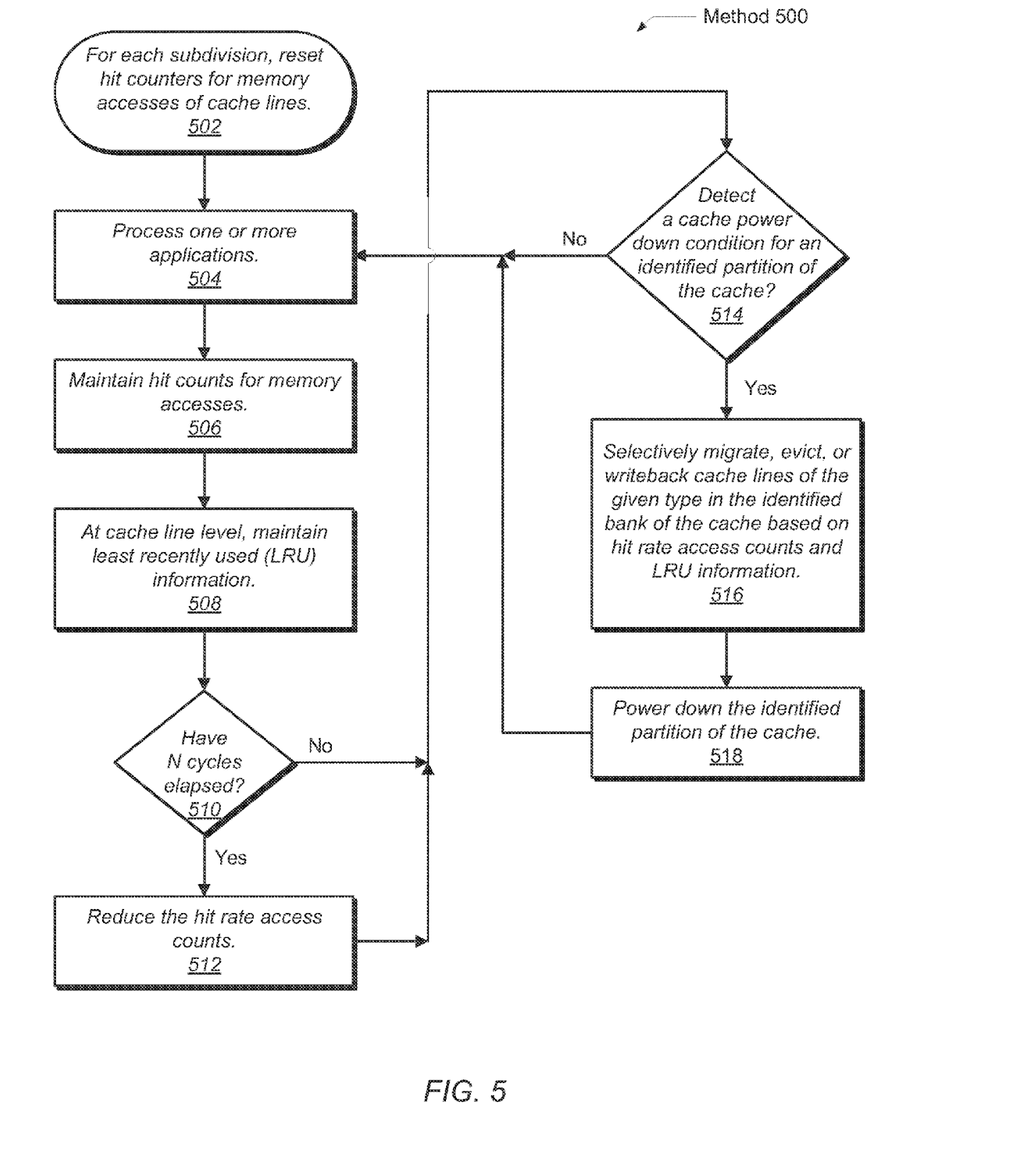
FIG. 5 is a generalized flow diagram of another embodiment of a method for efficiently reallocating data in a cache during power down of a bank.

Turning now to FIG. 5, a generalized flow diagram of one embodiment of a method 500 for efficiently reallocating data in a cache during power down of a bank is illustrated. Similar to method 400 and below methods, the components embodied in the computing system and cache storage arrangements described above may generally operate in accordance with method 500. Additionally, program instructions, or generally software, executable by a processor may cause operation in accordance with method 500 and the below methods. For purposes of discussion, the steps in this embodiment are shown in sequential order. However, some steps may occur in a different order than shown, some steps may be performed concurrently, some steps may be combined with other steps, and some steps may be absent in another embodiment.

In various embodiments, the criteria used to determine the locality of reference of cache lines of a given type includes a respective count of hits for read accesses, write accesses, or both read and write accesses on one or more cache lines of the given type within a subdivision of the identified partition to be powered down. In some embodiments, the respective count of hits includes hits on all cache lines of the given type within the subdivision. In some embodiments, the subdivision is a portion of a cache set within the identified partition. Each cache set may expand across the multiple partitions. The hits may include hits for read accesses, write accesses, or both. The counters may be stored in the cache array within the subdivisions. Alternatively, the counters may be stored within the control logic in the cache controller.

In some embodiments, the counters have their count values reduced in response to N cycles have elapsed, wherein N is an integer. Therefore, a rate of hits for memory accesses may be measured. In these embodiments, the counters may be viewed as hit rate counters. For example, the count values may be halved after N cycles, wherein N may be selected based on previous simulations or other empirical studies. Other reductions of the count values other than halving the values may be used. The value N and the amount of reduction for the counts may be stored in respective CSRs. The value N and the amount of reduction for the counts may be programmable. Alternatively, the value N and the amount of reduction for the counts may be stored or utilized in a non-programmable manner, such as being stored in a read-only memory (ROM), being implemented in a circuit or control logic, being hard-wired to given value, and so forth. Reducing the count values over time may retain past history behavior while providing emphasis on recent behavior.

In addition, the criteria, used to determine the locality of reference of cache lines of the given type may include a respective least-recently-used (LRU) value for the cache line of the given type. In block 502, the hit count values for the subdivisions, such as cache sets, are reset. Along with other values stored in CSRs, these values are reset or reprogrammed while software applications are being processed. In block 504, the instructions of one or more software applications are processed and a given cache is accessed.

In block 506, the hit counts of memory accesses are maintained. The memory accesses may be read accesses, write accesses, or both read and write accesses. In some embodiments, the hit counts are maintained at a subdivision level. In various embodiments, the subdivision is a cache set within the cache. In block 508, the LRU information is maintained. In some embodiments, the LRU information is maintained at a subdivision level. In various embodiments, the subdivision is a cache set within the cache.

If N cycles have elapsed or detected to occur (conditional block 510), then in block 512, the hit counts are reduced, such as being halved. If a cache power down condition is detected for an identified partition of the cache (conditional block 514), then in block 516, the cache lines of the given type in the identified partition of the cache are selectively migrated to another partition, evicted from the identified bank, such as being invalidated; or written back to lower-level memory based on both the LRU information and the hit counts. Again, the hit counts may be for read accesses, write accesses, or both read and write accesses. In some embodiments, the LRU information and hit counts are combined with each value having an equal weight or priority. In other embodiments, the priority may be given to one of the LRU information and the hit counts over the other during the determination process. In some embodiments, the cache lines of the given type that are not migrated are invalidated, whereas dirty cache lines of the given type that are not migrated are written back to lower-level memory. Afterward, in block 518, the identified partition in the cache is powered down or made unavailable (inactive).

Figure 6:
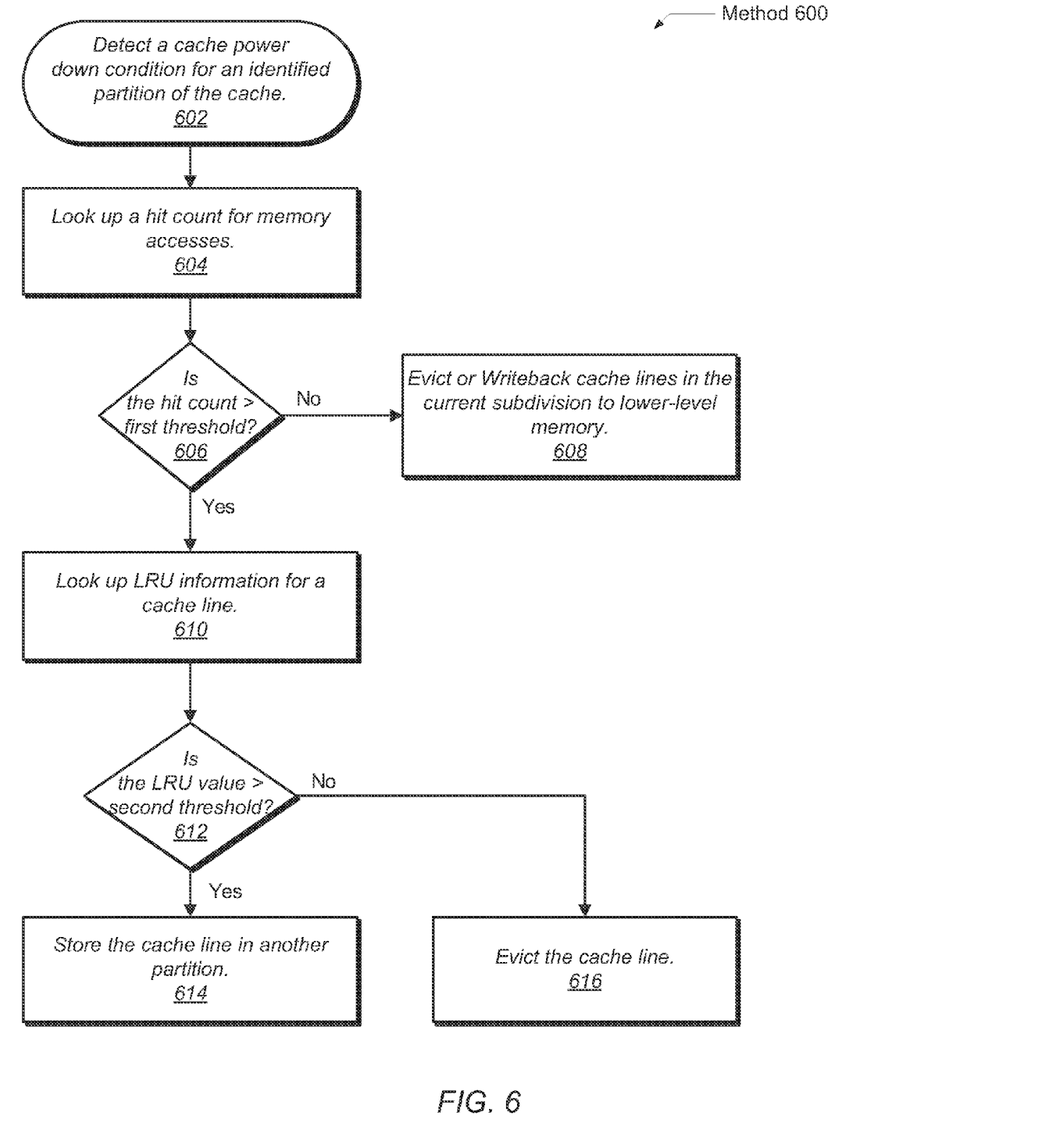
FIG. 6 is a generalized flow diagram of another embodiment of a method for efficiently reallocating data in a cache during power down of a bank.

Referring now to FIG. 6, a generalized flow diagram of one embodiment of a method 600 for efficiently reallocating data in a cache during power down of a bank is illustrated. For purposes of discussion, the steps in this embodiment are shown in sequential order. However, some steps may occur in a different order than shown, some steps may be performed concurrently, some steps may be combined with other steps, and some steps may be absent in another embodiment.

In block 602, a cache power down condition is detected for an identified partition of the cache and notification is sent to the corresponding cache controller. In block 604, a hit count for memory accesses is looked up. The memory accesses may be write accesses, read accesses, or both write and read accesses. In some embodiments, the hit count is for a given subdivision in an identified partition in the cache. As described earlier, in various embodiments, the subdivision is a cache set within the cache and the partition is a cache set within the cache. In various embodiments, the hit count is for cache lines of a given type within the subdivision. In some embodiments, the cache lines of the given type are dirty cache lines. If the looked up hit count does not exceed a corresponding threshold (conditional block 606), then in block 608, cache lines are evicted from the current subdivision, such as being invalidated; or written back to lower-level memory. In various embodiments, the cache lines are cache lines of the given type. In some embodiments, clean cache lines of the given type that are not migrated are invalidated, whereas dirty cache lines of the given type that are not migrated are written back to lower-level memory.

If the looked up hit count exceeds the corresponding threshold (conditional block 606), then in block 610, LRU information is looked up. In some embodiments, the LRU information corresponds to cache lines of the given type in the current subdivision. In various embodiments, an LRU value in the looked up LRU information may correspond to a given cache line of the given type in the current subdivision. If the LRU value in the looked up LRU information exceeds a corresponding threshold (conditional block 612), then in block 614, the cache line is stored in another partition in the cache. In various embodiments, the cache line is a cache line of the given type and the other partition is another active bank in the cache. Otherwise, in block 616, the cache line is evicted without being written back to lower-level memory. In various embodiments, the cache line is a cache line of the given type and it is invalidated in the identified partition. The identified partition may be a cache set within the cache. Alternatively, the cache line is written back to lower-level memory. In various embodiments, clean cache lines of the given type that are not migrated or stored in another partition may be invalidated, whereas dirty cache lines of the given type that are not migrated or stored in another partition may be written back to lower-level memory.

While the above examples describe selectively migrating cache lines of a given type in an identified partition to be powered down to a single other active partition, it is possible and contemplated the cache lines of the given type are selectively migrated to one or more of other multiple active banks. The selection of the other active bank may be based on utilization of the other active banks, current memory access traffic of the other active banks, physical distance, and other criteria. Similarly, while the above examples describe one partition or bank being shut down, it is possible and contemplated multiple partitions may be simultaneously shut down or otherwise made unavailable.

In other embodiments, the aggregate memory access traffic due to write backs from multiple powering down banks may be used as criteria in selection logic. Although the above examples utilized partitioned caches, the described systems and methods may be applied to die-stacked DRAM caches, multi-banked scratch pad memory, distributed caches, non-uniform cache architectures (NUCAs), and other cache organizations.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a cache array comprising at least a first partition and a second partition;
   a cache controller coupled to the cache array; and
   a lower-level memory;
   wherein in response to a request to power down the first partition of the plurality of partitions, the cache controller is configured to:
   select a cache line stored in the first partition;
   if it is determined likely the cache line is to be used again, store the cache line in the second partition;
   if it is determined likely the cache line is not to be used again:
   invalidate the cache line, if the cache line corresponds to a first type; and
   store the cache line in the lower-level memory, if the cache line corresponds to a second type different from the first type.

2. The computing system as recited in claim 1, wherein a cache line corresponds to a type that includes at least one of a dirty cache line state, a clean cache line state, a local node state, a remote node state, a cache coherence state, a processor owner identifier (ID), a thread ID, a system-level transaction ID, a shared state, a private state, an instruction type, and a data type.

3. The computing system as recited in claim 2, wherein the cache controller is configured to store the cache line in the second partition in further response to determining the cache line also corresponds to a given type.

4. The computing system as recited in claim 1, wherein to determine whether it is likely the cache line is to be used again, at least one of the following is considered: (i) whether the cache line is located within a re-use distance that exceeds a first threshold, (ii) whether the cache line is shared by a plurality of processor cores, and (iii) cache line metadata in the first partition, the second partition, or both.

5. The computing system as recited in claim 1, wherein each of the first partition and the second partition comprises a plurality of subdivisions, and wherein the cache controller is further configured to maintain a respective count of cache line hits for cache lines for each of the plurality of subdivisions.

6. The computing system as recited in claim 5, wherein the plurality of partitions is a plurality of banks in the cache and the plurality of subdivisions is a plurality of cache sets in the cache.

7. The computing system as recited in claim 5, wherein the cache controller is further configured to reduce the respective counts responsive to determining N cycles have elapsed, wherein N is an integer.

8. The computing system as recited in claim 5, wherein to determine whether it is likely the cache line is to be used again, at least one of the following is considered: (i) a respective least-recently-used (LRU) value for the cache line and (ii) a respective count of cache line hits for cache lines for a given subdivision of the plurality of subdivisions storing the cache line.

9. The computing system as recited in claim 8, wherein to determine it is likely the cache line is not to be used again, said respective count for the given subdivision is determined not to exceed a second threshold.

10. The computing system as recited in claim 8, wherein to determine it is likely the cache line is not to be used again, the following are determined:
    said respective count for the given subdivision does not exceed a second threshold; and
    the respective LRU value for the cache line does not exceed a third threshold.

11. The computing system as recited in claim 8, wherein to determine it is likely the cache line is be used again, the following are determined:
    said respective count for the given subdivision does exceed a second threshold; and
    the respective LRU value for the cache line does exceed a third threshold.

12. A method executable by at least one processor in a computing system, the method comprising:
    in response to a request to power down a first partition in a cache comprising at least the first partition and a second partition:
        selecting a cache line stored in the first partition;
        if it is determined likely the cache line is to be used again, storing the cache line in the second partition;
        if it is determined likely the cache line is not to be used again:
            invalidating the cache line, if the cache line corresponds to a first type; and
            storing the cache line in the lower-level memory, if the cache line corresponds to a second type different from the first type.

13. The method as recited in claim 12, wherein a cache line corresponds to a type that includes at least one of a dirty cache line state, a clean cache line state, a local node state, a remote node state, a cache coherence state, a processor owner identifier (ID), a thread ID, a system-level transaction ID, a shared state, a private state, an instruction type, and a data type.

14. The method as recited in claim 13, wherein the method comprises storing the cache line in the second partition in further response to determining the cache line also corresponds to a given type.

15. The method as recited in claim 12, wherein to determine whether it is likely the cache line is to be used again, the method further comprises considering at least one of (i) whether the cache line is located within a re-use distance that exceeds a first threshold, (ii) whether the cache line is shared by a plurality of processor cores, and (iii) cache line metadata in the first partition, the second partition, or both.

16. The method as recited in claim 12, wherein to determine whether it is likely the cache line is to be used again, the method further comprises considering at least one of (i) a respective least-recently-used (LRU) value for the cache line and (ii) a respective count of cache line hits for cache lines for a given subdivision of a plurality of subdivisions in the first partition, wherein the given subdivision stores the cache line.

17. A cache controller comprising:
    a first interface coupled to a cache array comprising at least a first partition and a second partition for storing data;
    a second interface coupled to a lower-level memory; and
    a control unit; and
    wherein in response to a request to power down the first partition, the control unit is configured to:
        select a cache line stored in the first partition;
        if it is determined likely the cache line is to be used again, store the cache line in the second partition;
        if it is determined likely the cache line is not to be used again:
            invalidate the cache line, if the cache line corresponds to a first type; and
            store the cache line in the lower-level memory, if the cache line corresponds to a second type different from the first type.

18. The cache controller as recited in claim 17, wherein each of the first partition and the second partition comprises a plurality of subdivisions, and wherein the control unit is further configured to maintain a respective count of cache line hits for cache lines for each of the plurality of subdivisions.

19. The cache controller as recited in claim 18, wherein to determine whether it is likely the cache line is to be used again, the control unit is configured to consider at least one of (i) a respective least-recently-used (LRU) value for the cache line and (ii) a respective count of cache line hits for cache lines for a given subdivision of the plurality of subdivisions storing the cache line.

20. The cache controller as recited in claim 19, wherein to determine it is likely the cache line is not to be used again, the control unit is further configured to determine said respective count for the given subdivision does not exceed a second threshold.

* * * * *

UNITED STATES PATENT AND TRADEMARK OFFICE
CERTIFICATE OF CORRECTION

Page 1 of 1

PATENT NO.        : 9,251,081 B2
APPLICATION NO.   : 13/957105
DATED             : February 2, 2016
INVENTOR(S)       : Chang et al.

It is certified that error appears in the above-identified patent and that said Letters Patent is hereby corrected as shown below:

In the Claims:

Column 15, Claim 11, Line 28, please delete "is be used" and substitute -- is to be used --.

Signed and Sealed this
Twelfth Day of April, 2016

Michelle K. Lee
*Director of the United States Patent and Trademark Office*